United States Patent
Schmidt et al.

(10) Patent No.: US 9,510,314 B2
(45) Date of Patent: Nov. 29, 2016

(54) METHOD AND EVOLVED NODE-B FOR GEOGRAPHIC BIN DATA COLLECTION AND REPORTING

(71) Applicant: Intel IP Corporation, Santa Clara, CA (US)

(72) Inventors: Andreas Schmidt, Braunschweig (DE); Joey Chou, Scottsdale, AZ (US)

(73) Assignee: Intel IP Corporation, Santa Clara, CA (US)

(*) Notice: Subject to any disclaimer, the term of this patent is extended or adjusted under 35 U.S.C. 154(b) by 0 days.

(21) Appl. No.: 14/318,076

(22) Filed: Jun. 27, 2014

(65) Prior Publication Data

US 2015/0195805 A1    Jul. 9, 2015

Related U.S. Application Data

(60) Provisional application No. 61/924,194, filed on Jan. 6, 2014.

(51) Int. Cl.
*H04W 64/00* (2009.01)
*H04W 24/08* (2009.01)
*H04W 24/10* (2009.01)

(52) U.S. Cl.
CPC ............. *H04W 64/00* (2013.01); *H04W 24/08* (2013.01); *H04W 24/10* (2013.01)

(58) Field of Classification Search
CPC .... H04W 24/08; H04W 24/10; H04W 64/00
USPC ................. 455/456.1, 456.3, 456.5
See application file for complete search history.

(56) References Cited

U.S. PATENT DOCUMENTS

| 8,098,590 B2 | 1/2012 | Catovic et al. |
| 2007/0019769 A1 | 1/2007 | Green et al. |
| 2007/0298806 A1 | 12/2007 | Venkatachalam |

(Continued)

FOREIGN PATENT DOCUMENTS

| TW | 201536069 A | 9/1951 |
| WO | WO-2012031552 A1 | 3/2012 |

(Continued)

OTHER PUBLICATIONS

"International Application Serial No. PCT/US2014/068847, International Search Report mailed Mar. 23, 105", 3 pgs.

(Continued)

*Primary Examiner* — Sam Bhattacharya
(74) *Attorney, Agent, or Firm* — Schwegman Lundberg & Woessner, P.A.

(57) ABSTRACT

Embodiments of an Evolved Node-B (eNB) and method for collecting and reporting data related to a coverage area in a wireless network are generally described herein. The eNB may be configured to track geographic bin information for one or more User Equipment (UEs). The eNB may comprise hardware processing circuitry configured to, for each of the UEs, measure an angle of arrival for the UE and a propagation delay for the UE, and to select a geographic bin for the UE from a set of candidate geographic bins. The hardware processing circuitry may be further configured to send, for each of the candidate geographic bins, performance data for the candidate geographic bin to the TCE when a number of UEs for which the candidate geographic bin is selected is not less than a UE distribution threshold.

19 Claims, 6 Drawing Sheets

(56) References Cited

U.S. PATENT DOCUMENTS

| | | |
|---|---|---|
| 2010/0323723 A1 | 12/2010 | Gerstenberger et al. |
| 2011/0201279 A1 | 8/2011 | Suzuki et al. |
| 2012/0129522 A1 | 5/2012 | Kim et al. |
| 2015/0195706 A1 | 7/2015 | Luft et al. |

FOREIGN PATENT DOCUMENTS

| | | |
|---|---|---|
| WO | WO-2013048331 A1 | 4/2013 |
| WO | WO-2013109080 A1 | 7/2013 |
| WO | WO-2013191506 A1 | 12/2013 |
| WO | WO-2015102811 A1 | 7/2015 |
| WO | WO-2015102812 A1 | 7/2015 |

OTHER PUBLICATIONS

"International Application Serial No. PCT/US2014/068847, Written Opinion mailed Mar. 23, 2015", 4 pgs.

"International Application Serial No. PCT/US2014/068888, International Search Report mailed Mar. 24, 2015", 3 pgs.

"International Application Serial No. PCT/US2014/068888, Written Opinion mailed Mar. 24, 2015", 5 pgs.

"Taiwanese Application Serial No. 103142203, Office Action mailed Nov. 26, 2015", W/ English Translation, 16 pgs.

METHOD AND EVOLVED NODE-B FOR GEOGRAPHIC BIN DATA COLLECTION AND REPORTING

PRIORITY CLAIM

This application claims priority under 35 USC 119(e) to U.S. Provisional Patent Application Ser. No. 61/924,194, filed Jan. 6, 2014, which is incorporated herein by reference in its entirety.

TECHNICAL FIELD

Embodiments pertain to wireless communications. Some embodiments relate to geographic bin data collection in wireless networks. Some embodiments relate to Minimization of Drive Testing (MDT) messages in a 3GPP network.

BACKGROUND

A wireless network may be designed and deployed with the goal of supporting communication services between base stations and mobile devices during most typical scenarios and use cases. These scenarios may be characterized by large variations in parameters that are significant to the network design, such as the loading or quantity of mobile devices expected to be active during different time periods. The initial design of the network may utilize statistical models of such parameters, and this approach may provide a good starting point for the deployment of the network. However, the performance of a deployed network, even a well designed one, may be further optimized or improved based on actual data collected in the field. As an example, the number of mobile devices actually operating in a particular geographic region at a certain time of the day or the typical signal strength received at those mobile devices may be different than originally planned or modeled in the network design.

The collection of such data may assist network designers or self-organization or self-optimization processes operating in the network. However, the amount of data collected for a typical geographic coverage area may be quite large, especially in busy areas. The transmission of the data over a backhaul from a base station to other components in the network for further processing may be intractable in such cases. In addition, a significant amount of the data may not even be particularly useful, and transmission of it may cause congestion in the network or may hinder the processing of the data that is useful. As such, there are general needs for systems and methods of collecting, filtering, and sending geographic bin data to other components for processing.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

In some embodiments, mobile devices or other devices described herein may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the mobile device or other device can be a User Equipment (UE) or an Evolved Node-B (eNB) configured to operate in accordance with 3GPP standards. In some embodiments, the mobile device or other device may be configured to operate according to other protocols or standards, including IEEE 802.11 or other IEEE standards. In some embodiments, the mobile device or other device may include one or more of a keyboard, a display, a non-volatile memory port, multiple antennas, a graphics processor, an application processor, speakers, and other mobile device elements. The display may be an LCD screen including a touch screen.

Figure 1:
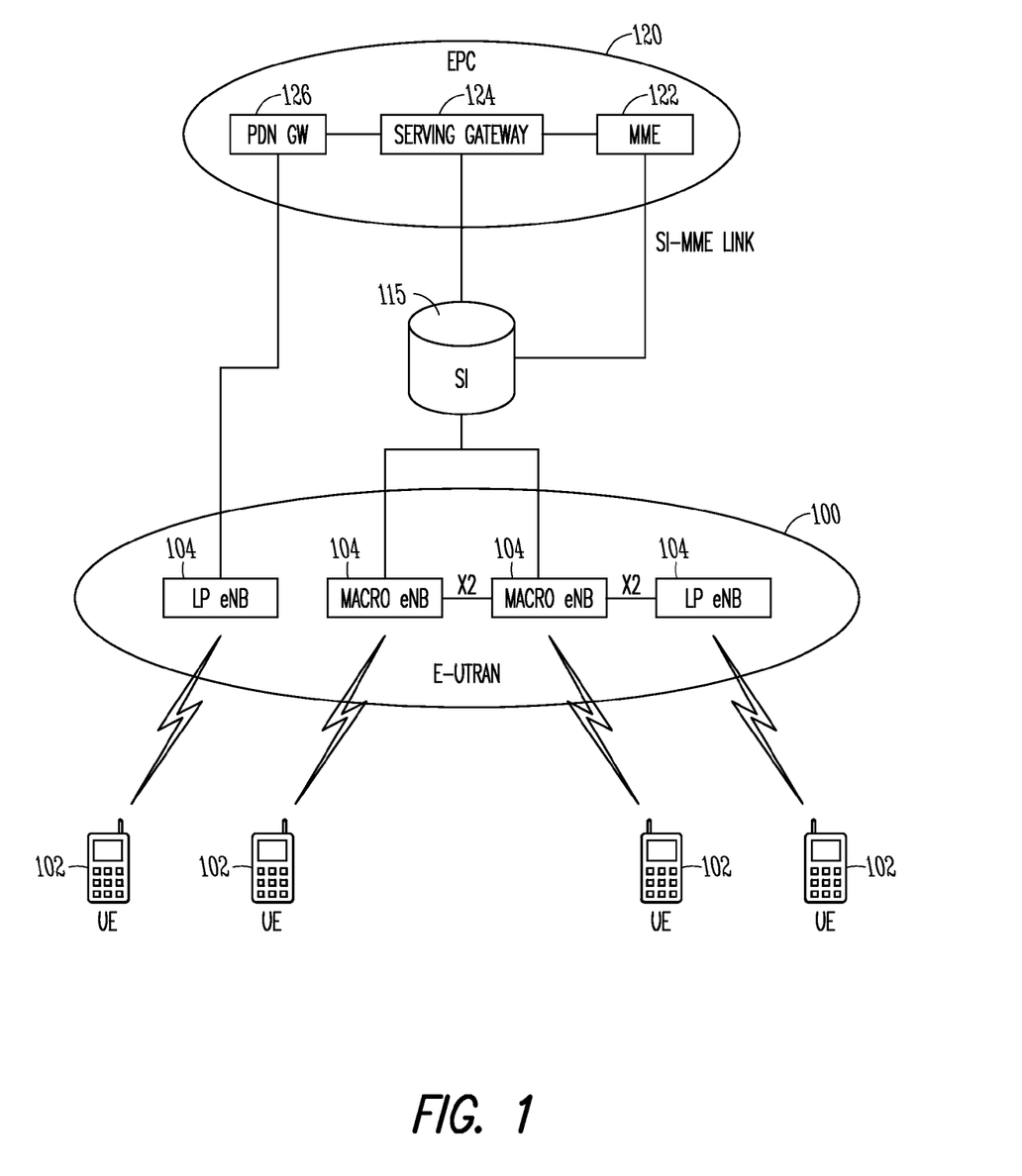
FIG. 1 is a functional diagram of a 3GPP network in accordance with some embodiments.

FIG. 1 shows a portion of an end-to-end network architecture of an LTE network with various components of the network in accordance with some embodiments. The network 100 comprises a radio access network (RAN) (e.g., as depicted, the E-UTRAN or evolved universal terrestrial radio access network) 100 and the core network 120 (e.g., shown as an evolved packet core (EPC)) coupled together through an S1 interface 115. For convenience and brevity sake, only a portion of the core network 120, as well as the RAN 100, is shown.

The core network 120 includes mobility management entity (MME) 122, serving gateway (serving GW) 124, and packet data network gateway (PDN GW) 126. The RAN 100 includes enhanced node B's (eNBs) 104 (which may operate as base stations) for communicating with UE 102. The eNBs 104 may include macro eNBs and low power (LP) eNBs.

The MME is similar in function to the control plane of legacy Serving GPRS Support Nodes (SGSN). The MME manages mobility aspects in access such as gateway selection and tracking area list management. The serving GW 124 terminates the interface toward the RAN 100, and routes data packets between the RAN 100 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The eNBs 104 (macro and micro) terminate the air interface protocol and may be the first point of contact for a UE 102. In some embodiments, an eNB 104 may fulfill various logical functions for the RAN 100 including but not limited to RNC (radio network controller functions) such as radio bearer management, uplink and downlink dynamic radio resource management and data packet scheduling, and mobility management. In accordance with embodiments, UEs 102 may be configured to communicate OFDM communication signals with an eNB 104 over a multicarrier communication channel in accordance with an OFDMA communication technique. The OFDM signals may comprise a plurality of orthogonal subcarriers.

The S1 interface 115 is the interface that separates the RAN 100 and the EPC 120. It is split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

In some embodiments, a downlink resource grid may be used for downlink transmissions from an eNB 104 to a UE 102. The grid may be a time-frequency grid, called a resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements and in the frequency domain and represents the smallest quanta of resources that currently can be allocated. There are several different physical downlink channels that are conveyed using such resource blocks. With particular relevance to this disclosure, two of these physical downlink channels are the physical downlink shared channel and the physical down link control channel.

The physical downlink shared channel (PDSCH) carries user data and higher-layer signaling to a UE 102 (FIG. 1). The physical downlink control channel (PDCCH) carries information about the transport format and resource allocations related to the PDSCH channel, among other things. It also informs the UE 102 about the transport format, resource allocation, and H-ARQ information related to the uplink shared channel. Typically, downlink scheduling (assigning control and shared channel resource blocks to UEs 102 within a cell) is performed at the eNB 104 based on channel quality information fed back from the UEs 102 to the eNB 104, and then the downlink resource assignment information is sent to a UE 102 on the control channel (PDCCH) used for (assigned to) the UE 102.

The PDCCH uses CCEs (control channel elements) to convey the control information. Before being mapped to resource elements, the PDCCH complex-valued symbols are first organized into quadruplets, which are then permuted using a sub-block inter-leaver for rate matching. Each PDCCH is transmitted using one or more of these control channel elements (CCEs), where each CCE corresponds to nine sets of four physical resource elements known as resource element groups (REGs). Four QPSK symbols are mapped to each REG. The PDCCH can be transmitted using one or more CCEs, depending on the size of DCI and the channel condition. There may be four or more different PDCCH formats defined in LTE with different numbers of CCEs (e.g., aggregation level, L=1, 2, 4, or 8).

Figure 2:
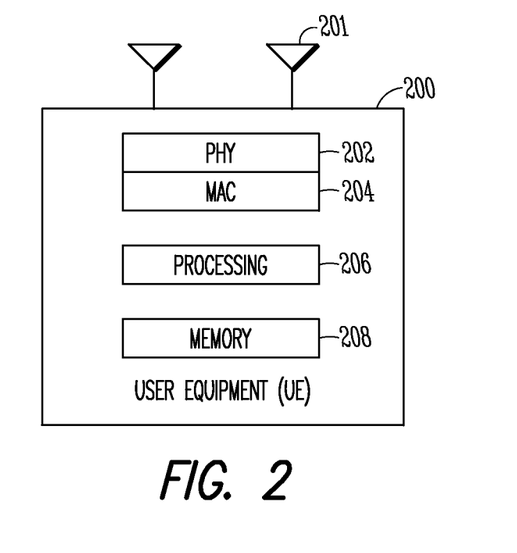
FIG. 2 is a functional diagram of a User Equipment (UE) in accordance with some embodiments.
Figure 3:
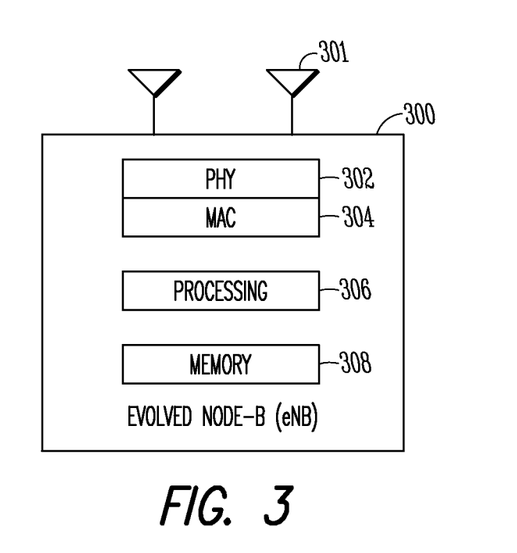
FIG. 3 is a functional diagram of an Evolved Node-B (eNB) in accordance with some embodiments.

FIG. 2 shows a block diagram of a UE 200 in accordance with some embodiments, while FIG. 3 shows a block diagram of an eNB 300 in accordance with some embodiments. It should be noted that in some embodiments, the eNB 300 may be a stationary non-mobile device. The UE 200 may be a UE 102 as depicted in FIG. 1, while the eNB 300 may be an eNB 104 as depicted in FIG. 1. The UE 200 may include physical layer circuitry 202 for transmitting and receiving signals to and from the eNB 300, other eNBs, other UEs or other devices using one or more antennas 201, while the eNB 300 may include physical layer circuitry 302 for transmitting and receiving signals to and from the UE 200, other eNBs, other UEs or other devices using one or more antennas 301. The UE 200 may also include medium access control layer (MAC) circuitry 204 for controlling access to the wireless medium, while the eNB 300 may also include medium access control layer (MAC) circuitry 304 for controlling access to the wireless medium. The UE 200 may also include processing circuitry 206 and memory 208 arranged to perform the operations described herein, and the eNB 300 may also include processing circuitry 306 and memory 308 arranged to perform the operations described herein.

The antennas 201, 301 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 201, 301 may be effectively separated to take advantage of spatial diversity and the different channel characteristics that may result.

Although the UE 200 and eNB 300 are each illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

In accordance with embodiments, the eNB 104 may be configured to track geographic bin information for one or more UEs 102. The eNB 104 may comprise hardware processing circuitry configured to, for each of the UEs 102, based on a reception of one or more packets from the UE 102, measure an angle of arrival for the UE 102 and a propagation delay for the UE 102. The hardware processing circuitry may be further configured to select, for each of the UEs 102, a geographic bin for the UE 102 from a set of candidate geographic bins. In some embodiments, the selection may be based at least partly on the measurements of the angle of arrival and the propagation delay. The hardware processing circuitry may be further configured to send, for each of the candidate geographic bins, performance data for the candidate geographic bin to a Trace Collection Entity (TCE) when a number of UEs 102 for which the candidate geographic bin is selected is not less than a UE distribution threshold. These embodiments are described in more detail below.

Figure 4:
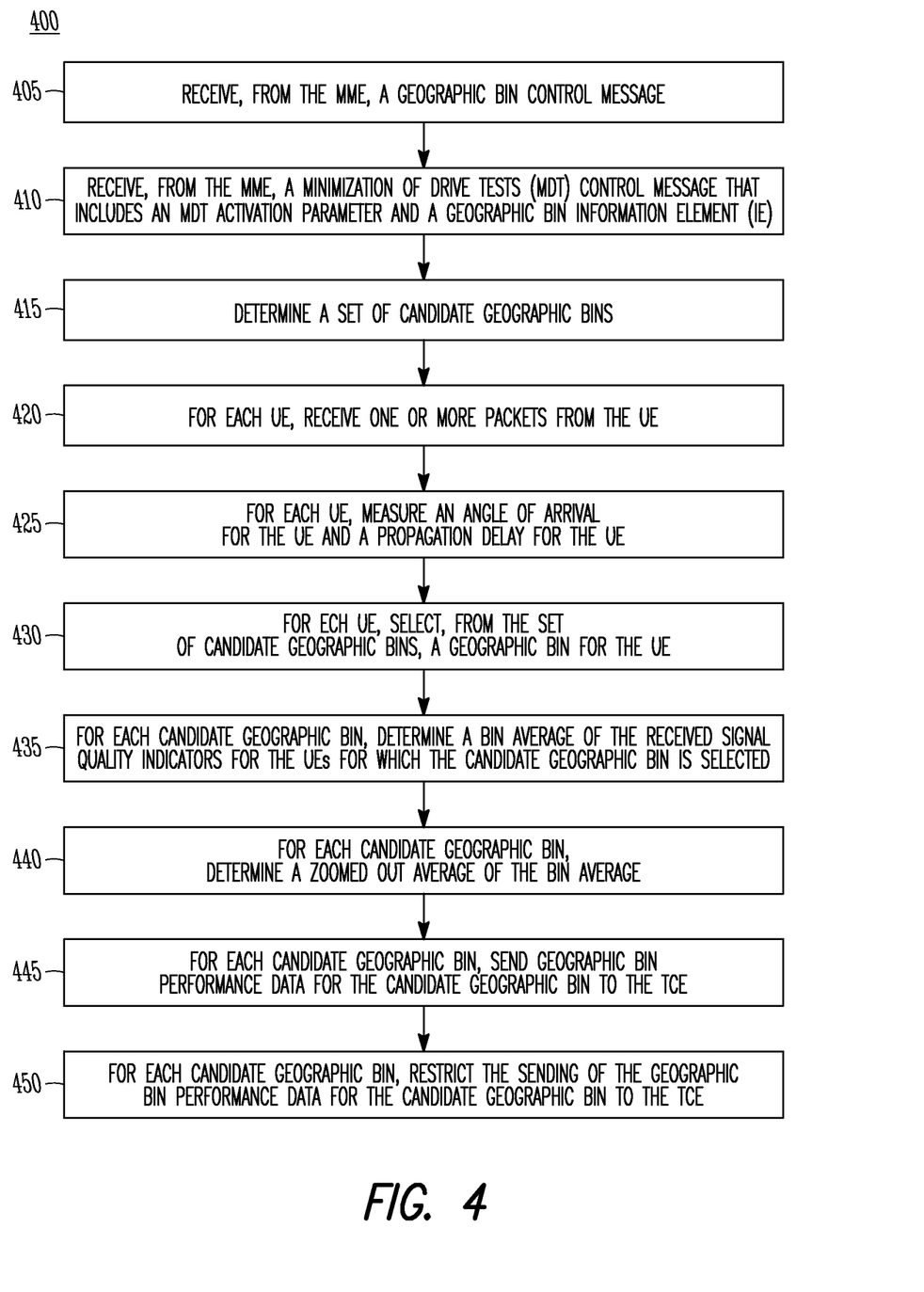
FIG. 4 illustrates the operation of a method for collecting and reporting geographic bin data in a wireless network in accordance with some embodiments.

Referring to FIG. 4, a method 400 of collecting and reporting geographic bin data is shown. It is important to note that embodiments of the method 400 may include additional or even fewer operations or processes in comparison to what is illustrated in FIG. 4. In addition, embodiments of the method 400 are not necessarily limited to the chronological order that is shown in FIG. 4. In describing the method 400, reference may be made to FIGS. 1-3 and 5-7, although it is understood that the method 400 may be practiced with any other suitable systems, interfaces and components. In addition, while the method 400 and other methods described herein may refer to UEs 102 operating in accordance with 3GPP or other standards, embodiments of those methods are not limited to just those UEs 102 and may also be practiced on other mobile devices. Moreover, the method 400 and other methods described herein may be practiced by wireless devices configured to operate in other suitable types of wireless communication systems, including systems configured to operate according to various IEEE standards such as IEEE 802.11.

At operation 405 of the method 400, at an eNB 104, a geographic bin control message may be received from an MME, while at operation 410, a Minimization of Drive Tests (MDT) control message that includes an MDT activation parameter and a geographic bin information element (IE) may be received at the eNB 104 from the MME. It should be noted that the geographic bin control message and the geographic bin IE may be stand-alone messages or may be included as part of another control message or other message, and in some embodiments, the geographic bin control message and the geographic bin IE may even be the same entity. In addition, the geographic bin control message or the geographic bin IE may be included as part of another control message designed or intended to support geographic bin data collection and reporting, but may also be transported as part of an existing and established control message. As an example, the geographic bin IE may be included as part of a Minimization of Drive Testing (MDT) message, as known in the art of 3GPP, and may or may not be related to the MDT functionality of the system. In such cases, the MDT message may transport or "piggy-back" the geographic bin IE.

Figure 5:
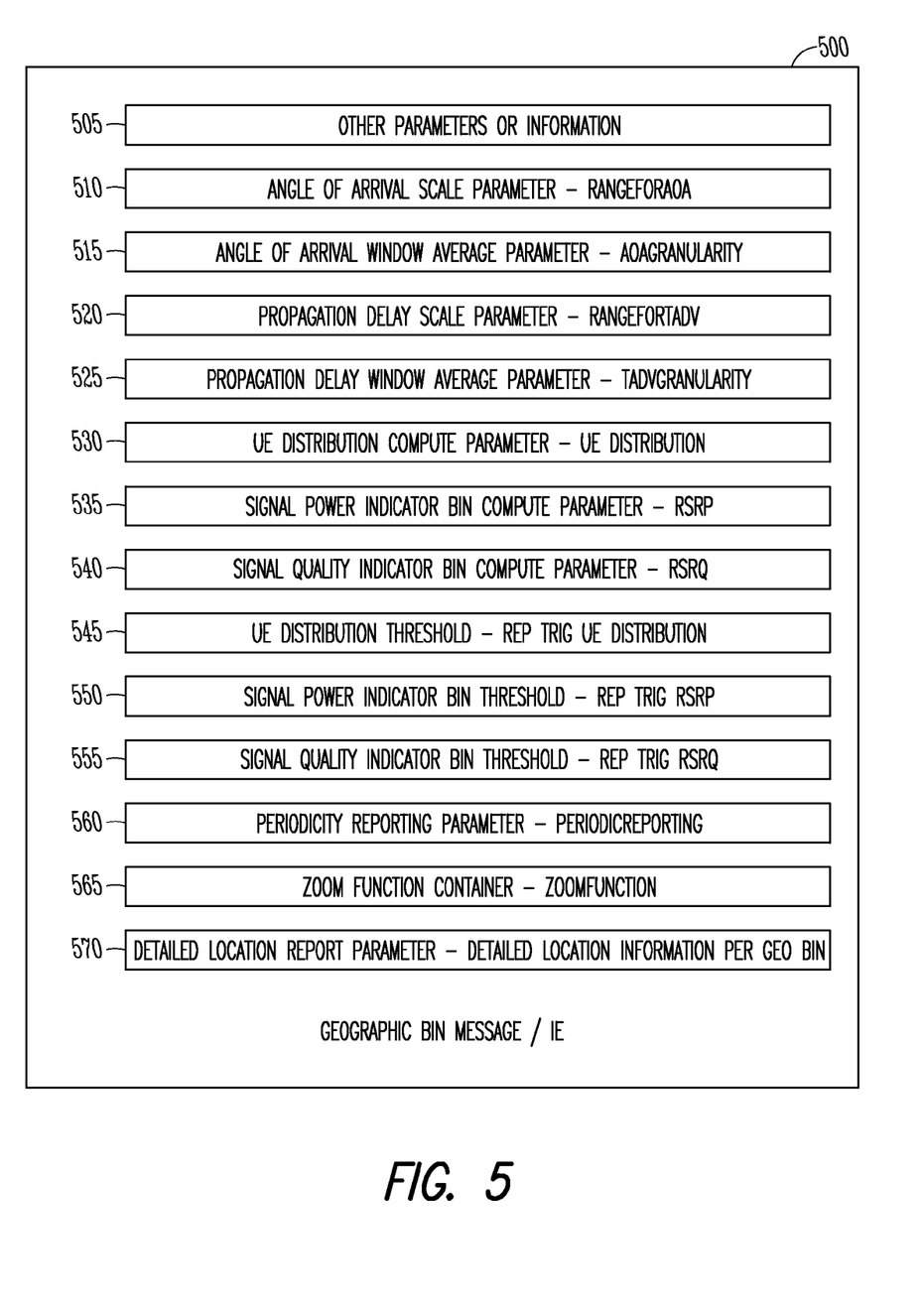
FIG. 5 illustrates an example of a geographic bin information element (IE) or message in accordance with some embodiments.

Referring to FIG. 5, an example of a geographic bin IE 500 is shown. It should be noted that the geographic bin IE 500 or the geographic bin control message may include some or all of the parameters shown in FIG. 5 and may include additional parameters not shown in FIG. 5. While some of the parameters in the geographic bin IE 500 may be related to geographic bin data collection and reporting, the geographic bin IE 500 may also include other parameters or information 505, which may be related to other aspects of the system or eNBs 104 or UEs 102 configured to operate in the system.

The geographic bin IE 500 may also include an angle of arrival scale parameter 510, which may be referred to as RangeForAoA or similar. The angle of arrival scale parameter 510 may be used to configure a coverage area of an eNB 104 into geographic bins, in which each geographic bin is characterized by an angle of arrival of a wireless signal transmitted to the eNB 104 from a UE 102 located in the bin. The value of the angle of arrival scale parameter 510 may be enumerated, and may include, for example, an angle scale or angle resolution for dividing the coverage area into geographic bins or a number of angles into which the coverage area should be divided. The value of the angle of arrival scale parameter 510 is not limited to these values, however, as any suitable parameter that enables the eNB 104 to divide the coverage area into geographic bins may be used.

The geographic bin IE 500 may also include a propagation delay scale parameter 520, which may be referred to as RangeForTadv or similar. The propagation delay scale parameter 520 may also be used to configure the coverage area of the eNB 104 into geographic bins, in which each geographic bin is characterized by a propagation delay of a wireless signal transmitted to the eNB 104 from a UE 102 located in the bin. It should be noted that, as known in the art, there is a relationship between propagation delay and distance. Therefore, a propagation delay associated with a geographic bin may serve to also characterize (exactly or approximately) the distance between the geographic bin and the eNB 104. It is also known in the art that, in some systems, measurements of the propagation delay, either one-way or two-way, may be collected at a base station or eNB 104 and communicated to the UE 102 in a control message or other message. Accordingly, the UE 102 may adjust or advance its transmit timing so that signals transmitted from the UE 102 arrive at the eNB 104 with the appearance of no propagation delay.

It should be noted that the propagation delay scale parameter 520 may be used in conjunction with the angle of arrival scale parameter 510 to divide the coverage area into two-dimensional geographic bins, as described earlier. In some embodiments, however, the propagation delay scale parameter 520 or the angle of arrival scale parameter 510 may be used separately or in combination with other parameters to divide the coverage area into geographic bins. The value of the propagation delay scale parameter 520 may be enumerated, and may include, for example, a propagation delay or distance scale or resolution for dividing the coverage area into geographic bins. The value of the propagation delay scale parameter 520 is not limited to these values, however, as any suitable parameter that enables the eNB 104 to divide the coverage area into geographic bins may be used.

The geographic bin IE 500 may also include an angle of arrival window average parameter 515, which may be referred to as AoAGranularity or similar. In addition, geographic bin IE 500 may also include a propagation delay window average parameter 525, which may be referred to as TadvGranularity or similar. In order to enable a "zooming-out" functionality for measurements taken in the geographic bins, measurements taken in one or more adjacent geographic bins can be averaged together in some fashion. For instance, individual bin averages for each of the geographic bins may be formed by averaging received signal power indicators for UEs 102 located in the bin, as a first operation. A zoomed-out moving average for each of the geographic bins may be performed by averaging the individual bin averages of the geographic bins and one or more adjacent geographic bins. As such, the moving averaged data may be smoother than the individual bin averages, especially when some of the bins do not have sufficient sample sizes (such as UEs 102 present in the bins) for the measurements.

In accordance with the moving average process just described, the angle of arrival window average parameter 515 and the propagation delay window average parameter 525 may be used to specify or determine the number of adjacent geographic bins to be used in the zoomed-out moving average or a size of the moving average window. The angle of arrival window average parameter 515 and the propagation delay window average parameter 525 may be enumerated and may include an angle scale, angle resolution, delay scale, delay resolution, numbers that specify a window size in an angular or radial direction, or any suitable quantity that enables the eNB 104 to perform zoomed-out moving averages of measurements.

The geographic bin IE 500 may also include a UE distribution compute parameter 530, which may be referred to as "UE distribution" or similar. The UE distribution compute parameter 530 may specify or direct the eNB 104 on whether or not to measure or perform computations related to the UE distribution in the geographic bins. As an example, for each UE 102 operating in the coverage area, the eNB 104 may assign the UE 102 to a geographic bin, and may further compute UE distributions related to each geographic bin. The UE distribution for a geographic bin may be a count of the number of UEs 102 located in the bin. Accordingly, UE distribution compute parameter 530 may be Boolean, taking on values such as yes/no, true/false or similar, and may refer to whether or not the eNB 104 should perform UE distribution measurements or computations.

It should be noted that the UE 102 may take one or more measurements of received signal power and/or received signal quality at the UE 102 based on a reception of a signal from the eNB 104. In some embodiments, the received signal power can be a received signal level (for example, in Watts), a received signal strength indicator (RSSI) or any appropriate quantity that characterizes received signal power at the UE 102. In some embodiments, the received signal quality can be a received signal-to-noise ratio (SNR), carrier-to-interference (C/I) ratio or any appropriate quantity that characterizes received signal quality at the UE 102. Accordingly, the measurement of received signal power or quality may be taken at any appropriate location at the UE 102. For instance, the measurement may be taken at the front end of the UE 102 or may be taken at the output of a demodulator within the UE 102. In addition, the received signal power or quality may be referred to in scalar or logarithmic (dB) terms.

The UE 102 may process or convert the measurements into appropriate indicators for communication to the eNB 104. The indicators may include single measurements, multiple measurements, average measurements or any appropriate indicator of received signal power or quality at the UE 102. As an example, an average received signal power indicator may be an average of the dB values of multiple individual measurements of received signal power, such as RSSI. As such, packets sent from the UE 102 to the eNB 104 may include one or more received signal power indicators or received signal quality indicators. In addition, the use of thresholds, comparisons or averages of received signal power indicators or received signal quality indicators described below may utilize these techniques, and the thresholds and results may also be referred to in similar units, such as scalar, logarithmic or dB.

The geographic bin IE 500 may also include a signal power indicator bin compute parameter 535, which may be referred to as RSRP or similar. In addition, the geographic bin IE 500 may also include a signal quality indicator bin compute parameter 540, which may be referred to as RSRQ or similar. Both of these parameters may be Boolean, taking on values such as yes/no, true/false or similar, and may refer to whether or not the eNB 104 should perform averaging computations on the received signal power indicator or received signal quality indicator of UEs 102 in each geographic bin.

The geographic bin IE 500 may also include a UE distribution threshold 545, which may be referred to as "Rep Trig UE distribution" or similar. The UE distribution threshold 545 may specify a threshold in terms of number of UEs 102, percentage of UEs 102 or other suitable quantity. The eNB 104 may utilize the UE distribution threshold 545 as part of a decision process on whether or not to send or report data to other components in the network (such as the TCE described earlier). As an example, if the number of UEs 102 determined to be operating in a particular geographic bin is lower than the threshold specified by the UE distribution threshold 545, that bin may be considered sparsely populated. Data for that bin, such as the average received signal indicator or quality indicator of UEs 102 in that bin, may be considered irrelevant or not useful. In such cases, it may be determine that the data for that bin should not be sent or reported to the TCE or other network components.

The geographic bin IE 500 may also include a signal power indicator bin threshold 550, which may be referred as "Rep Trig RSRP" or similar. The geographic bin IE 500 may also include a signal quality indicator bin threshold 555, which may be referred to as "Rep Trig RSRQ" or similar. These two thresholds 550,555 may be used in a similar or analogous manner to the UE distribution threshold 545. For a particular geographic bin, the received signal power or quality indicators of the UEs 102 determined to be located in that bin may be averaged and compared to the appropriate threshold 550 or 555. As an example, if the average of the received signal power indicators of UEs 102 in the bin is lower than the threshold 550, the data for that bin may be considered irrelevant or not useful and therefore not sent or reported to the TCE or other network components. Similar operations may be performed for received signal quality indicators of the UEs 102 with the threshold 555. It should be noted that decisions about the relevance or usefulness of data for a particular geographic bin may be based on comparisons using any or all of the UE distribution threshold 545, the signal power indicator bin threshold 550, the signal quality indicator bin threshold 555 or other thresholds.

The geographic bin IE 500 may also include a periodicity reporting parameter 560, which may be referred to as "PeriodicReporting" or similar. The periodicity reporting parameter 560 may inform or request that the UE 102 report data to the TCE or other component in the network in a periodic manner. The periodicity reporting parameter 560 may also include a period of time that can define how often the data is reported, such as one second.

The geographic bin IE 500 may also include a zoom function container 565, which may be referred to as "Zoom-Function" or similar. The zoom function container 565 may include information that informs the eNB 104 to zoom in or zoom out the geographic bins. Accordingly, the geographic bins may be reconfigured in response. As an example, the reconfiguration may be performed according to the values currently in use for the angle of arrival scale parameter 510 or propagation delay scale parameter 520. A zooming in by a factor of two, for instance, may be performed by dividing both the angle of arrival scale parameter 510 and propagation delay scale parameter 520 by two.

The geographic bin IE 500 may also include a detailed location report parameter 570, which may be referred to as "Detailed Location Information per Geo Bin" or similar. The detailed location report parameter 570 may be Boolean, taking on values such as yes/no, true/false or similar, and may refer to whether or not the eNB 104 should include detailed location information, such as Global Navigation Satellite System (GNSS) coordinates, when sending or reporting data to the TCE or other network component. As an example, for a particular geographic bin for which data is reported, the GNSS coordinates determined to be the center of that bin may be included with the data. As another example, the GNSS coordinates of UEs 102 determined to be located in that bin may be reported to the eNB 104 from each UE 102, such as in a control portion of a packet. The eNB 104 may average the GNSS coordinates for the UEs 102 in that bin, and include that information as part of the data.

Figure 6:
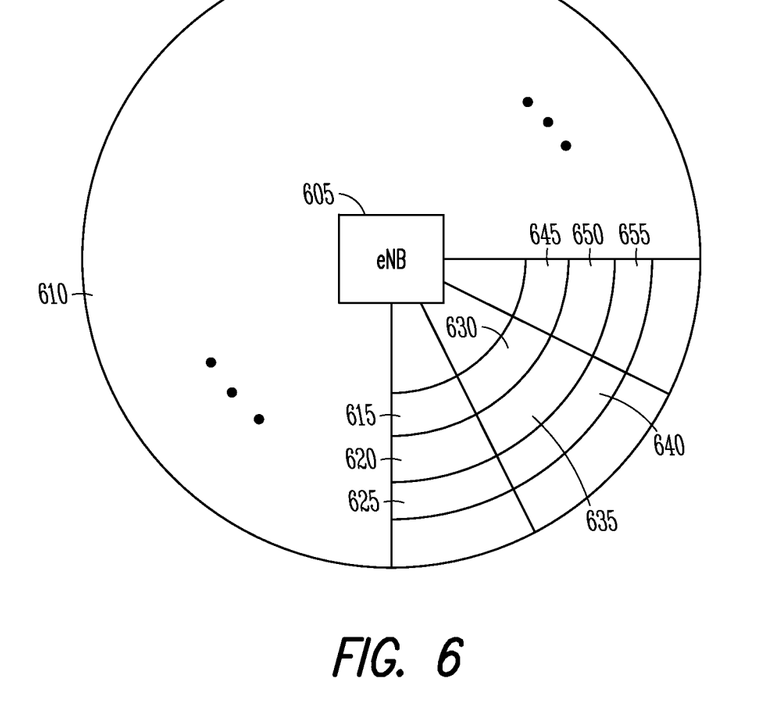
FIG. 6 illustrates an example of a coverage area for an eNB configured into geographic bins in accordance with some embodiments.

Returning to the method 400, at operation 415, a set of candidate geographic bins may be determined. The determination may be based on previously described parameters received in the geographic bin IE 500, such as the angle of arrival scale parameter 510 or the propagation delay scale parameter 520, but is not limited as such. Other parameters describing similar concepts may be communicated to the eNB 104 in other messages or may be predefined or part of a standard. In any case, a non-limiting example of determining the set of candidate geographic bins is shown in FIG. 6 for an eNB 605, which may be the eNB 104 that supports UEs 102 operating in or located in the coverage area 610. Note that for ease of illustration, the division of the coverage area 610 into sectors is not shown, but is well known in the art. In this example, several geographic bins 615-655 are shown, each with an angular coverage of about 30 degrees, which may be the value for the angle of arrival scale parameter 510. The division of the coverage area 610 into bins 615-655 in the radial direction (on an axis going toward or away from the eNB 605) is also performed such that the beginning and end of one of the bins 615-655 covers a certain distance in the radial direction. The distance, or a propagation delay difference related to that distance, may be the value for the propagation delay scale parameter 520. It should also be noted that although the example in FIG. 6 shows what appear to be uniformly scaled geographic bins 615-655, the division of the coverage area 610 is not limited as such, and non-uniform scales may be used. As an example, the bins 625, 640, 655 located further from the eNB 605 in FIG. 6 are larger than the bins 615, 630, 645 located closer to the eNB 605, an inherent result of geometry. A non-uniform scaling approach may use a smaller value for the angular coverage in regions further from the eNB 605.

At operation 420 of the method 400, the eNB 104 may receive one or more packets from each of the UEs 102 in the system, and based on the reception, an angle of arrival for the UE 102 and a propagation delay for the UE 102 may be determined at operation 425. The actual, or determined, angle of arrival may be an angle at which signals transmitted from the UE 102 arrive at the eNB 104, and accordingly, may indicate or be related to an angle at which the UE 102 is physically located with respect to the eNB 104 or an appropriate reference point. The determination of the angle of arrival may be performed using any suitable technique known in the art, such as beam-forming or other directional antenna techniques. The propagation delay may be determined using any suitable technique known in the art related to the reception, including correlation of a known sequence included in the packets to determine the delay as a difference between the arrival time of the sequence and a reference time. As previously described, propagation delays associated with transmission of signals between the UE 102 and the eNB 104, or measurements or estimates of those delays, may indicate or be related to a distance between the UE 102 and eNB 104. As such, the determined or estimated angle of arrival and propagation delay may be used to estimate a location of the UE 102 with respect to the eNB 104, and may be used in determining a geographic bin for the UE 102. The angle of arrival and propagation delay and location of the UEs 102 may also be determined using location services such as GPS or GNSS.

At operation 430 of the method 400, a geographic bin from the set of candidate geographic bins may be determined for each UE 102. The determination may be based on any or all of the angle of arrival, propagation delay or other parameters or measurements. As an example, the eNB 104 may determine, for each of the set of candidate geographic bins, an angle associated with a center of the bin and an expected propagation delay based on the distance between the center of the bin and the eNB 104. That information may be compared to the determined angle of arrival and propagation delay of a particular UE 102 to determine a geographic bin for the UE 102. That is, the UE 102 may be assigned to that bin or may be considered as located in that bin.

At operation 435 of the method 400, for each candidate geographic bin, a bin average of the received signal quality indicators for the UEs 102 for which the candidate geographic bin is selected may be determined. The bin average may be a mean value or a weighted average value. At operation 440, a zoomed-out average of the bin averages may be determined for each candidate geographic bin. Referring to the example in FIG. 6, a zoomed-out average for the geographic bin 635 may be an average of the bin averages of the geographic bin 635 and any or all of the adjacent bins 615-655 shown, or other bins not shown. As an example, bin averages for the nine geographic bins 615-655 may be averaged to produce the zoomed-out average for the bin 635. As another example, the zoomed-out average may be performed only in the radial direction such that the zoomed-out average for the bin 635 is the average of the bin averages for bins 630, 635, and 640. As another example, the zoomed-out average may be performed only in the angular direction such that the zoomed-out average for the bin 635 is the average of the bin averages for bins 620, 635, and 650. The number of adjacent bins over which the zoomed-out average is to be performed may be specified, as mentioned earlier, by parameters such as the angle of arrival window average parameter 515, the propagation delay window average parameter 525 or other similar or predefined parameters. In addition, while operations 435 and 440 relate to the received signal quality indicators of the UEs 102, similar operations may be performed on other quantities related to the UEs 102, such as the received signal power indicators of those UEs 102.

At operation 445, for any or all of the candidate geographic bins, geographic bin performance data may be sent to the TCE. At operation 450, the sending of the geographic bin performance data may be restricted for any or all of the candidate geographic bins. As such, for a bin for which the sending is restricted, the geographic bin performance data for the bin may be sent at a low frequency or may not be sent. As mentioned earlier, the decision on whether or not to send the geographic bin performance data for a particular candidate geographic bin may be based on comparisons of determined statistics of the bin with any or all of the UE distribution threshold 545, the signal power indicator bin threshold 550, the signal quality indicator bin threshold 555 or other thresholds. As an example, if the number of UEs 102 determined to be located in the bin is less than the UE distribution threshold 545, the sending of the geographic bin performance data to the TCE may be restricted or not performed. As another example, if the bin average or a zoomed-out average of the received signal power indicators or received signal quality indicators of those UEs 102 is less than the appropriate threshold 550 or 555, the sending of the geographic bin performance data to the TCE may be restricted or not performed.

It should be noted that the transmission of the geographic bin performance data from the eNB 104 to the TCE may be performed directly or indirectly. In some embodiments, the eNB 104 may be configured to communicate directly with the TCE. In some embodiments, the eNB 104 may be configured to communicate with the TCE through an indirect path that may include other components, such as an Element Manager (EM), as known in the art. In some embodiments, the geographic bin performance data may even be sent from the TCE to other network components or may be logged or stored at any appropriate location for future processing such as historical modeling Referring to FIG. 7, an example of a Trace Record (TR) message 700 is shown. A TR message 700, or other message, may be used for reporting geographic bin performance data from the eNB 104 to the TCE or other network component. It should be noted that the TR message 700 may include some or all of the parameters shown in FIG. 7 and may include additional parameters not shown in FIG. 7. In addition, the geographic bin performance data may be included as part of another control message designed or intended to support geographic bin data collection and reporting, but may also be transported as part of an existing and established control message. As an example, the geographic bin performance data may be included as part of the TR message 700, and may or may not be related to other Trace Record or Trace Collection functionalities of the system. In such cases, the TR message 700 may transport or "piggy-back" the geographic bin performance data.

Figure 7:
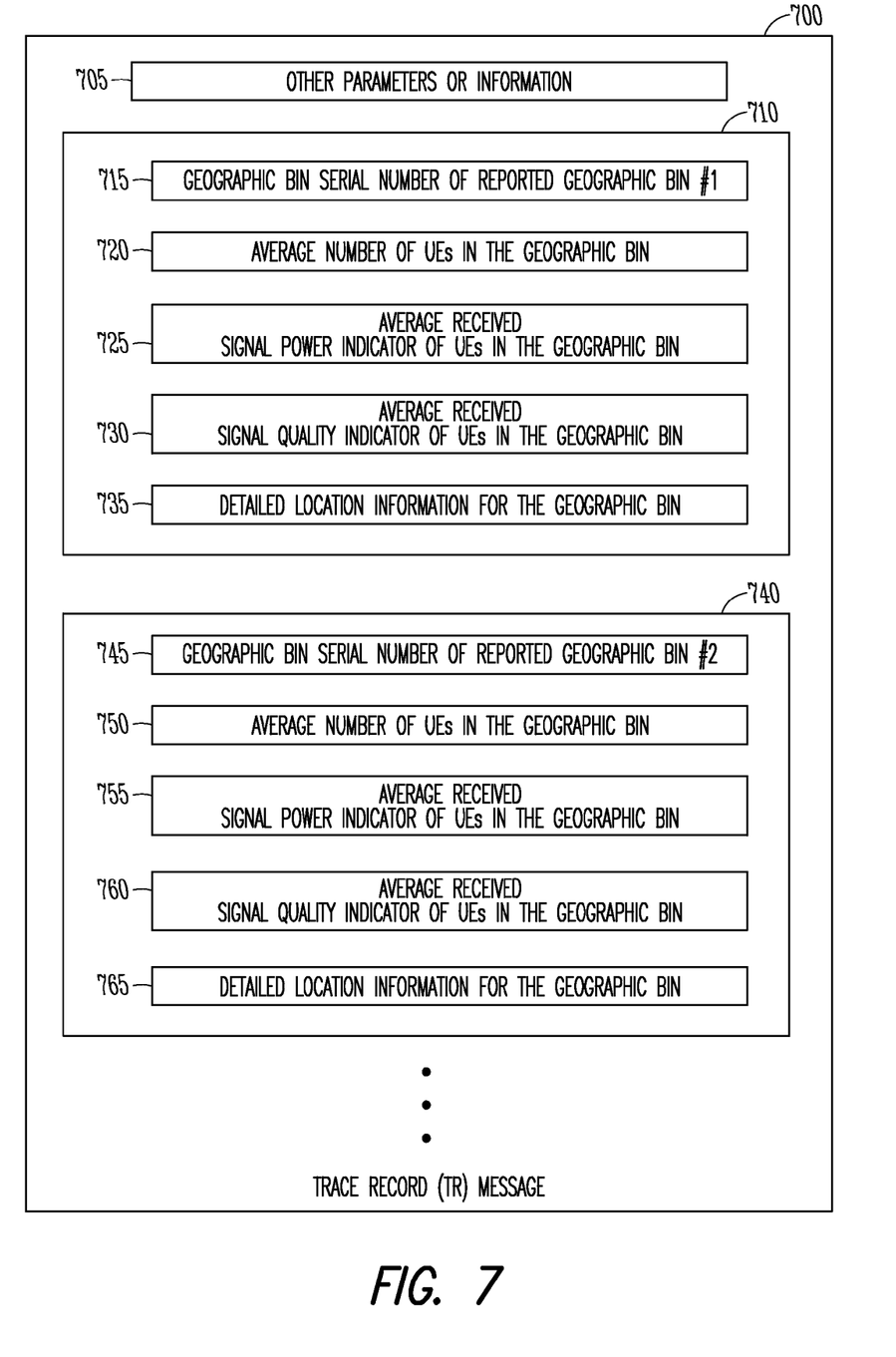
FIG. 7 illustrates an example of a Trace Record message that may be used to report geographic bin performance data in accordance with some embodiments.

The TR message 700 may include other parameters or information 705 that may or may not be related to the geographic bin performance data reporting. The TR message may include one or more geographic bin performance data containers 710, 740, in which each of the containers 710, 740 is related to a geographic bin for which it is determined that geographic bin performance data should be communicated from the eNB 104 to the TCE. Note that although only two such containers 710, 740 are shown, the message 700 may include any suitable number of containers 710, 740, and the number may depend on the number of geographic bins for which it is determined that reporting should occur. The number may also depend on the frequency of reporting, which may be specified by a parameter such as the periodicity reporting parameter 560.

The container 710 relates to a first geographic bin for which geographic bin performance data is to be reported, and may include a geographic bin serial number 715 for the bin. The container 710 may also include any or all of an average number of UEs 102, an average received signal power indicator of the UEs 102 in the geographic bin, and an average received signal quality indicator of the UEs 102 in the geographic bin, as indicated by the fields 720, 725, and 730 respectively in FIG. 7. As previously described, these averages may be individual bin averages or zoomed-out moving averages. The container 710 may also include detailed location information for the geographic bin as indicated by the field 735, which may be GPS, GNSS or other suitable location information about the geographic bin for which the performance data is reported. The container 740 may include similar information in the fields 745-765 for a second geographic bin for which performance data is to be reported.

An Evolved Node-B (eNB) configured to track geographic bin information for one or more User Equipment (UEs) is disclosed herein. The eNB may comprise hardware processing circuitry configured to, for each of the UEs, based on a reception of one or more packets from the UE, measure an angle of arrival for the UE and a propagation delay for the UE. The hardware processing circuitry may be further configured to, from a set of candidate geographic bins, select a geographic bin for the UE, wherein the selection is based at least partly on the measurements of the angle of arrival and the propagation delay. The hardware processing circuitry may be further configured to, for each of the candidate geographic bins, when a number of UEs for which the candidate geographic bin is selected is not less than a UE distribution threshold, send geographic bin performance data for the candidate geographic bin to a Trace Collection Entity (TCE).

The hardware processing circuitry may be further configured to, for each of the candidate geographic bins, when the number of UEs for which the candidate geographic bin is selected is less than the UE distribution threshold, restrict the sending of the geographic bin performance data for the candidate geographic bin to the TCE. In some embodiments, the packets received from each UE may include a received signal power indicator for the UE associated with a reception, at the UE, of a wireless signal transmitted from the eNB. In some embodiments, the geographic bin performance data for the candidate geographic bin may include an average of the received signal power indicators for the UEs for which the candidate geographic bin is selected. The hardware processing circuitry may be further configured to receive, from a Mobility Management Entity (MME), a geographic bin control message that includes a signal power indicator bin threshold. The hardware processing circuitry may be further configured to, for each of the candidate geographic bins, when the average of the received signal power indicators for the UEs for which the candidate geographic bin is selected is less than the signal power indicator bin threshold, restrict the sending of the geographic bin performance data for the candidate geographic bin to the TCE.

In some embodiments, the packets received from each UE may include a received signal quality indicator for the UE associated with a reception, at the UE, of a wireless signal transmitted from the eNB. In some embodiments, the geographic bin performance data for the candidate geographic bin may include an average of the received signal quality indicators for the UEs for which the candidate geographic bin is selected. The hardware processing circuitry may be further configured to receive, from the MME, a geographic bin control message that includes a signal quality indicator bin threshold. The hardware processing circuitry may be further configured to, for each of the candidate geographic bins, when the average of the received signal quality indicators for the UEs for which the candidate geographic bin is selected is less than the signal quality indicator bin threshold, restrict the sending of the geographic bin performance data for the candidate geographic bin to the TCE. The hardware processing circuitry may be further configured to receive, from the MME, a geographic bin control message that includes an angle of arrival window average parameter and a propagation delay window average parameter. The hardware processing circuitry may be further configured to, for each of the candidate geographic bins, determine a bin average of the received signal quality indicators for the UEs for which the candidate geographic bin is selected. The hardware processing circuitry may be further configured to, for each of the candidate geographic bins, determine a zoomed-out average for the candidate geographic bin that is included in the geographic bin performance data. In some embodiments, the zoomed-out average may be determined as a windowed average of the bin average of the candidate geographic bin and the bin averages of adjacent candidate geographic bins according to the angle of arrival window average parameter and a propagation delay window average parameter.

The hardware processing circuitry may be further configured to receive, from the MME, a geographic bin control message that includes the UE distribution threshold. In some embodiments, the geographic bin control message may be a geographic bin information element (IE) that is included as part of a Minimization of Drive Testing (MDT) control message. In some embodiments, the geographic bin IE may be transported by the MDT control message.

The hardware processing circuitry may be further configured to receive, from the MME, a geographic bin control message that includes an angle of arrival scale parameter and a propagation delay scale parameter and to determine, based at least partly on the angle of arrival scale parameter and the propagation delay scale parameter, the set of candidate geographic bins. In some embodiments, the angle of arrival scale parameter may be related to an angle difference between any two adjacent candidate geographic bins at a particular radial distance from the eNB, and the propagation delay scale parameter may be related to a distance difference between any two adjacent candidate geographic bins at a particular angle with respect to an axis of the eNB. The hardware processing circuitry may be further configured to receive, from the MME, a geographic bin control message that includes a periodicity reporting parameter, and wherein the sending of performance data occurs according to the periodicity reporting parameter.

An Evolved Node-B (eNB) configured to collect and report data related to a coverage area in a wireless network is disclosed herein. The eNB may comprise hardware processing circuitry configured to receive, from a Mobility Management Entity (MME), a Minimization of Drive Tests (MDT) control message that includes an MDT activation parameter and a geographic bin information element (IE). The hardware processing circuitry may be further configured to configure the coverage area into a set of candidate geographic bins. The hardware processing circuitry may be further configured to, for each of one or more User Equipment (UEs), based at least partly on a reception of one or more packets from the UE, select a geographic bin from the set of candidate geographic bins for the UE. In some embodiments, the MDT activation parameter may indicate an MDT mode of operation for the eNB and the one or more UEs.

In some embodiments, the coverage area may be configured according to an angle of arrival scale parameter and a propagation delay scale parameter. In some embodiments, the geographic bin IE may include the angle of arrival scale parameter and the propagation delay scale parameter. In some embodiments, the geographic bin IE may further include a UE distribution threshold and the hardware processing circuitry may be further configured to send to the TCE a message that includes performance data for each candidate geographic bin in which a number of UEs for which the candidate geographic bin is selected is not less than the UE distribution threshold. In some embodiments, the packets received from each UE may include a received signal power indicator for the UE or a received signal quality indicator for the UE, and the received signal power indicator and the received signal quality indicator may be associated with a reception, at the UE, of a wireless signal transmitted from the eNB. The hardware processing circuitry may be further configured to determine, for each candidate geographic bin, geographic performance data that includes an average of the received signal power indicators or the received signal quality indicators of the UEs for which the candidate geographic bin is selected.

The hardware processing circuitry may be further configured to send, to a Trace Collection Entity (TCE) configured to operate in the wireless network, a message that includes geographic performance data for at least some of the candidate geographic bins. In some embodiments, the message may include, for each of the candidate geographic bins for which geographic performance data is sent, a geographic bin serial number that identifies the candidate geographic bin. In some embodiments, the message may include, for each of the candidate geographic bins for which geographic performance data is sent, a number of UEs for which the candidate geographic bin is selected.

A non-transitory computer-readable storage medium that stores instructions for execution by one or more processors to perform operations for collecting and sending geographic bin performance data is disclosed herein. The operations may configure the one or more processors to receive, at an Evolved Node-B (eNB) configured to track geographic bin information in a wireless network, packets from one or more User Equipment (UEs) configured to operate in the wireless network. The operations may further configure the one or more processors to measure, based on the reception of the packets from the UEs, an angle of arrival for each UE and a propagation delay for each UE. The operations may further configure the one or more processors to select for each UE, from a set of candidate geographic bins, a geographic bin for the UE, wherein the selection is based at least partly on the measurements of the angle of arrival for the UE and the propagation delay for the UE. The operations may further configure the one or more processors to, for each of the candidate geographic bins, when a number of UEs for which the candidate geographic bin is selected is not less than a UE distribution threshold, send geographic bin performance data to a Trace Collection Entity (TCE) configured to operate in the wireless network. The operations may further configure the one or more processors to receive, from a Mobility Management Entity (MME) configured to operate in the wireless network, a geographic bin control message that includes the UE distribution threshold. In some embodiments, the geographic bin control message may include an angle of arrival scale parameter and a propagation delay scale parameter. The operations may further configure the one or more processors to determine, based at least partly on the angle of arrival scale parameter and the propagation delay scale parameter, the set of candidate geographic bins.

A method of collecting and reporting data related to a coverage area in a wireless network is disclosed herein. The method may include receiving, at an Evolved Node-B (eNB) configured to track geographic bin information in a wireless network, packets from one or more User Equipment (UEs) configured to operate in the wireless network. The method may further include measuring, based on the reception of the packets from the UEs, an angle of arrival for each UE and a propagation delay for each UE. The method may further include selecting for each UE, from a set of candidate geographic bins, a geographic bin for the UE, wherein the selection is based at least partly on the measurements of the angle of arrival for the UE and the propagation delay for the UE.

The method may further include, for each of the candidate geographic bins, when a number of UEs for which the candidate geographic bin is selected is not less than a UE distribution threshold, sending geographic bin performance data to a Trace Collection Entity (TCE) configured to operate in the wireless network. The method may further include receiving, from a Mobility Management Entity (MME), a geographic bin control message that includes the UE distribution threshold. The method may further include restricting, for each of the candidate geographic bins, the sending of the geographic bin performance data to the TCE when a number of UEs for which the candidate geographic bin is selected is less than the UE distribution threshold.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An Evolved Node-B (eNB) configured to track geographic bin information for one or more User Equipment (UEs), the eNB comprising hardware processing circuitry configured to:
for each of the UEs:
based on a reception of one or more packets from the UE, measure an angle of arrival for the UE and a propagation delay for the UE;
from a set of candidate geographic bins, select a geographic bin for the UE, wherein the selection is based at least partly on the measurements of the angle of arrival and the propagation delay; and
for each of the candidate geographic bins, when a number of UEs for which the candidate geographic bin is selected is not less than a UE distribution threshold, send geographic bin performance data for the candidate geographic bin to a Trace Collection Entity (TCE).

2. The eNB according to claim 1, the hardware processing circuitry further configured to, for each of the candidate geographic bins, when the number of UEs for which the candidate geographic bin is selected is less than the UE distribution threshold, restrict the sending of the geographic bin performance data for the candidate geographic bin to the TCE.

3. The eNB according to claim 1, wherein:
the packets received from each UE include a received signal power indicator for the UE associated with a reception, at the UE, of a wireless signal transmitted from the eNB; and
the geographic bin performance data for the candidate geographic bin includes an average of the received signal power indicators for the UEs for which the candidate geographic bin is selected.

4. The eNB according to claim 3, the hardware processing circuitry further configured to:
receive, from a Mobility Management Entity (MME), a geographic bin control message that includes a signal power indicator bin threshold; and
for each of the candidate geographic bins, when the average of the received signal power indicators for the UEs for which the candidate geographic bin is selected is less than the signal power indicator bin threshold, restrict the sending of the geographic bin performance data for the candidate geographic bin to the TCE.

5. The eNB according to claim 1, wherein:
the packets received from each UE include a received signal quality indicator for the UE associated with a reception, at the UE, of a wireless signal transmitted from the eNB; and
the geographic bin performance data for the candidate geographic bin includes an average of the received signal quality indicators for the UEs for which the candidate geographic bin is selected.

6. The eNB according to claim 5, the hardware processing circuitry further configured to:
receive, from the MME, a geographic bin control message that includes a signal quality indicator bin threshold; and for each of the candidate geographic bins, when the average of the received signal quality indicators for the UEs for which the candidate geographic bin is selected is less than the signal quality indicator bin threshold, restrict the sending of the geographic bin performance data for the candidate geographic bin to the TCE.

7. The eNB according to claim 6, the hardware processing circuitry further configured to:
receive, from the MME, a geographic bin control message that includes an angle of arrival window average parameter and a propagation delay window average parameter;
for each of the candidate geographic bins, determine a bin average of the received signal quality indicators for the UEs for which the candidate geographic bin is selected; and
for each of the candidate geographic bins, determine a zoomed-out average for the candidate geographic bin that is included in the geographic bin performance data, wherein the zoomed-out average is determined as a windowed average of the bin average of the candidate geographic bin and the bin averages of adjacent candidate geographic bins according to the angle of arrival window average parameter and a propagation delay window average parameter.

8. The eNB according to claim 1, the hardware processing circuitry further configured to receive, from the MME, a geographic bin control message that includes the UE distribution threshold.

9. The eNB according to claim 8, wherein the geographic bin control message is a geographic bin information element (IE) that is included as part of a Minimization of Drive Testing (MDT) control message.

10. The eNB according to claim 9, wherein the geographic bin IE is transported by the MDT control message.

11. The eNB according to claim 1, the hardware processing circuitry further configured to:
receive, from the MME, a geographic bin control message that includes an angle of arrival scale parameter and a propagation delay scale parameter;
determine, based at least partly on the angle of arrival scale parameter and the propagation delay scale parameter, the set of candidate geographic bins.

12. The eNB according to claim 11, wherein the angle of arrival scale parameter is related to an angle difference between any two adjacent candidate geographic bins at a particular radial distance from the eNB, and the propagation delay scale parameter is related to a distance difference between any two adjacent candidate geographic bins at a particular angle with respect to an axis of the eNB.

13. The eNB according to claim 1, the hardware processing circuitry further configured to receive, from the MME, a geographic bin control message that includes a periodicity reporting parameter, and wherein the sending of performance data occurs according to the periodicity reporting parameter.

14. A non-transitory computer-readable storage medium that stores instructions for execution by one or more processors to perform operations for collecting and sending geographic bin performance data, the operations to configure the one or more processors to:

receive, at an Evolved Node-B (eNB) configured to track geographic bin information in a wireless network, packets from one or more User Equipment (UEs) configured to operate in the wireless network;
measure, based on the reception of the packets from the UEs, an angle of arrival for each UE and a propagation delay for each UE;
select for each UE, from a set of candidate geographic bins, a geographic bin for the UE, wherein the selection is based at least partly on the measurements of the angle of arrival for the UE and the propagation delay for the UE; and
for each of the candidate geographic bins, when a number of UEs for which the candidate geographic bin is selected is not less than a UE distribution threshold, send geographic bin performance data to a Trace Collection Entity (TCE) configured to operate in the wireless network.

15. The non-transitory computer-readable storage medium according to claim 14, the operations to further configure the one or more processors to receive, from a Mobility Management Entity (MME) configured to operate in the wireless network, a geographic bin control message that includes the UE distribution threshold.

16. The non-transitory computer-readable storage medium according to claim 15, wherein:
the geographic bin control message includes a angle of arrival scale parameter and a propagation delay scale parameter; and
the operations further configure the one or more processors to determine, based at least partly on the angle of arrival scale parameter and the propagation delay scale parameter, the set of candidate geographic bins.

17. A method of collecting and reporting data related to a coverage area in a wireless network, the method comprising:
receiving, at an Evolved Node-B (eNB) configured to track geographic bin information in a wireless network, packets from one or more User Equipment (UEs) configured to operate in the wireless network;
measuring, based on the reception of the packets from the UEs, an angle of arrival for each UE and a propagation delay for each LE;
selecting for each UE, from a set of candidate geographic bins, a geographic bin for the UE, wherein the selection is based at least partly on the measurements of the angle of arrival for the UE and the propagation delay for the UE; and
for each of the candidate geographic bins, when a number of UEs for which the candidate geographic bin is selected is not less than a UE distribution threshold, sending geographic bin performance data to a Trace Collection Entity (TCE) configured to operate in the wireless network.

18. The method according to claim 17, further comprising receiving, from a Mobility Management Entity (MME), a geographic bin control message that includes the UE distribution threshold.

19. The method according to claim 17, further comprising restricting, for each of the candidate geographic bins, the sending of the geographic bin performance data to the ICE when a number of UEs for which the candidate geographic bin is selected is less than the UE distribution threshold.

* * * * *

UNITED STATES PATENT AND TRADEMARK OFFICE
CERTIFICATE OF CORRECTION

PATENT NO. : 9,510,314 B2
APPLICATION NO. : 14/318076
DATED : November 29, 2016
INVENTOR(S) : Schmidt et al.

Page 1 of 1

It is certified that error appears in the above-identified patent and that said Letters Patent is hereby corrected as shown below:

On the Title Page

Item (72), in "Inventors", in Column 1, Line 1, after "Braunschweig", insert -- , NI--, therefor

In the Claims

Column 18, Line 27, Claim 16, delete "a" and insert --an--, therefor

Column 18, Line 42, Claim 17, delete "LE;" and insert --UE;--, therefor

Column 18, Line 60, Claim 19, delete "ICE" and insert --TCE--, therefor

Signed and Sealed this
Twenty-first Day of April, 2020

Andrei Iancu
*Director of the United States Patent and Trademark Office*